United States Patent [19]
Kazui et al.

[11] Patent Number: 5,719,963
[45] Date of Patent: Feb. 17, 1998

[54] TWO-DIMENSIONAL DISCRETE COSINE TRANSFORM COMPUTING CIRCUIT

[75] Inventors: Kimihiko Kazui; Kiyoshi Sakai; Kiichi Matsuda; Akira Nakagawa, all of Kawasaki, Japan

[73] Assignee: Fujitsu Limited, Kanagawa, Japan

[21] Appl. No.: 454,867

[22] Filed: May 31, 1995

[30] Foreign Application Priority Data

Jul. 27, 1994 [JP] Japan .................. 6-175002

[51] Int. Cl.$^6$ .................. G06K 9/20; G06K 9/38; G06F 17/14; G06F 15/00
[52] U.S. Cl. .................. 382/250; 382/281; 364/725; 364/715.02
[58] Field of Search .................. 382/281, 250; 364/725, 715.02

[56] References Cited

U.S. PATENT DOCUMENTS

| | | | |
|---|---|---|---|
| 5,097,331 | 3/1992 | Chen et al. | 358/138 |
| 5,181,183 | 1/1993 | Miyazaki | 364/725 |
| 5,293,434 | 3/1994 | Feig et al. | 364/725 |
| 5,452,466 | 9/1995 | Fettweis | 364/725 |

FOREIGN PATENT DOCUMENTS

| | | | |
|---|---|---|---|
| 0013069 | 7/1980 | European Pat. Off. | G06F 15/332 |
| 0366976 | 5/1990 | European Pat. Off. | G06F 15/332 |
| 0400729 | 12/1990 | European Pat. Off. | G06F 15/332 |
| 1443002 | 12/1988 | U.S.S.R. | G06F 15/332 |

OTHER PUBLICATIONS

IEEE Transactions on Acoustics, Speech, and Signal Processing, vol. ASSP-33, No. 6 "A Two-Dimensional Fast Cosine Transform", Dec. 1983 pp. 1532-1539.

IEEE Transactions on Communications, vol. COM-25, No. 9 "A Fast Computational Algorithm for the Discrete Cosine Transform", Sep. 1977, pp. 1004-1009.

S. Wolter et al. "Parallel Architectures for 8×8 Discrete Cosine Transform", 5110/92 pp. 149-152.

Cho et al., "A Part 4×4 DCT Algorithon for the Recursive 2-D DCT," Sep. 1, 1992, pp. 2166-2172.

S. Venkataraman et al., "Discrete Transforms Via The Walsh-Hadamard Transform", Jun. 1988, pp. 371-382.

M. Ghanbari et al., "Fast Cosine Transform Implementation for Television Signals", Feb. 1982 pp. 59-68.

Haque, "A Two-Dismensional Fast Cosine Transform", Dec. 1985 pp. 1532-1538.

Kou et al., "A New Look at DCT-type Transforms", Dec. 12, 1989 pp. 1899-1908.

*Primary Examiner*—Andrew Johns
*Assistant Examiner*—Monica S. Davis
*Attorney, Agent, or Firm*—Helfgott & Karas, P.C.

[57] ABSTRACT

A two-dimensional discrete cosine transform computing circuit has a transform block, formed by a multiplication unit and a Hadamard transform unit, which performs computations in a sequence of Hadamard transforms followed by multiplications in a two-dimensional discrete cosine transform, and in a sequence of multiplication followed by Hadamard transforms in an inverse two-dimensional discrete cosine transform. A memory block temporarily stores input/output data of the transform block; an input/output processing block performs pre-processing and post-processing such as cumulative addition and subtraction of input/output data of the transform block. A control block controls, when performing processing for either a two-dimensional discrete cosine transform or inverse two-dimensional discrete cosine transform, multiplications of coefficients in the transform block, read/write of the memory block, and the input/output processing block. This configuration achieves high-speed processing and a reduction in scale of the circuitry.

3 Claims, 14 Drawing Sheets

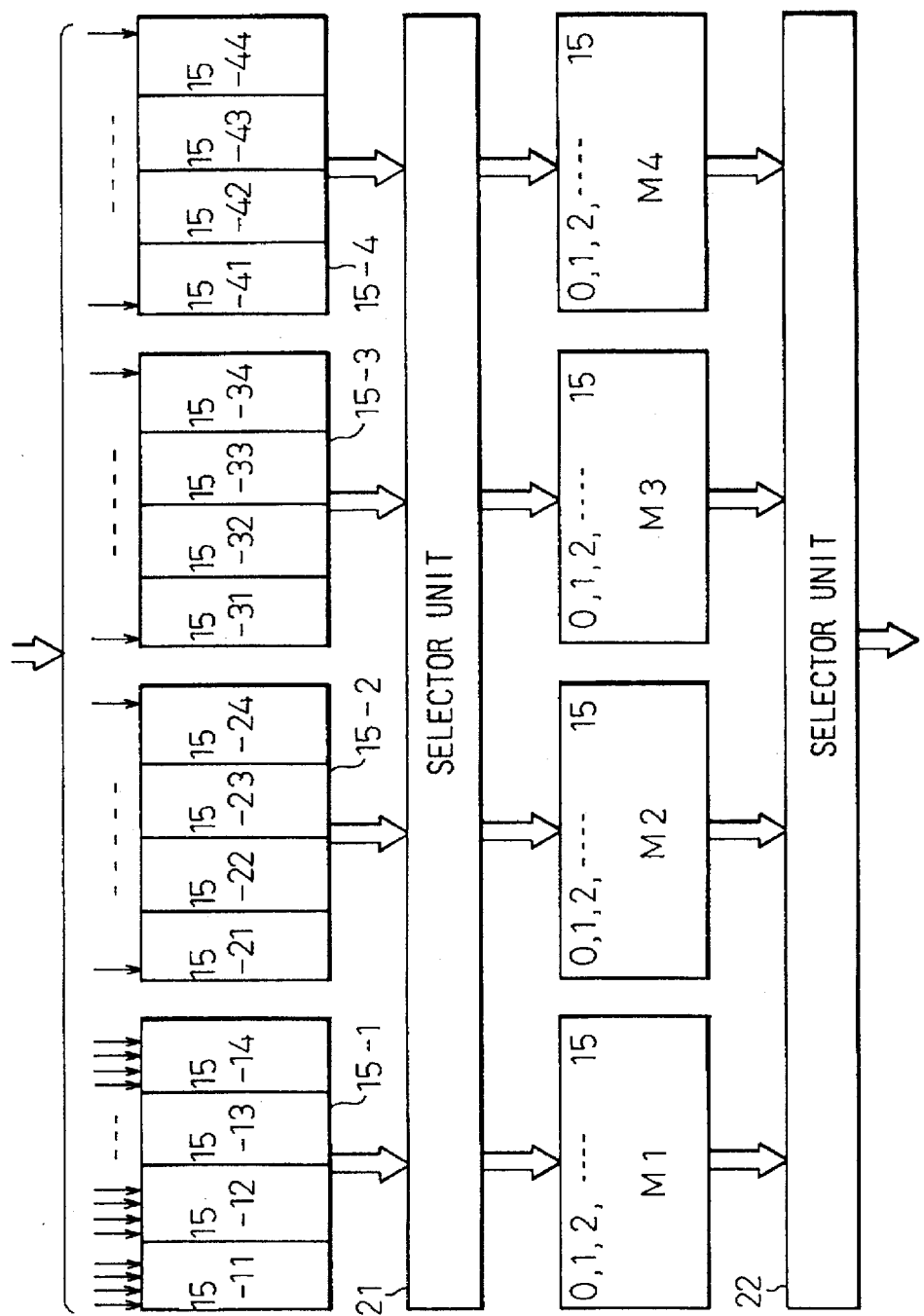

Fig.10

| $G_{m,n}$ | A0 | A1 | A2 | A3 | A4 | A5 | A6 | A7 | A8 | A9 | OUTPUT DATA $G_{m,n}$ |
|---|---|---|---|---|---|---|---|---|---|---|---|
| 11 | +11 | +11 | +11 | | | | | | | | 11 |
| 13 | +13 | +13 | | | +11 | | | | | | 11+13 |
| 31 | +31 | +31 | +31 | +13 | +13 | +13 | | | | | 11+31 |
| 33 | +33 | +33 | | +15 | | | +31 | +31 | | +31 | 11+13+31+33 |
| 15 | +15 | | | +15 | +15 | | | +33 | +33 | +33 | 13+15 |
| 17 | +17 | | | | +17 | +35 | | | | +35 | 11+13+15+17 |
| 35 | +35 | | +51 | | | | | | +35 | +37 | 13+33+15+35 |
| 37 | +37 | +51 | +51 | | | | +51 | +51 | | +51 | 11+13+31+33+15+17+35+37 |
| 51 | +51 | +51 | | | | +53 | +51 | +53 | +53 | +53 | 31+51 |
| 53 | +53 | +53 | +71 | | | | | | | +55 | 31+33+51+53 |
| 71 | +71 | +71 | +73 | | | +73 | | | | +57 | 11+31+51+71 |
| 73 | +73 | +73 | | | | +55 | | | | | 11+13+31+33+51+53+71+73 |
| 55 | +55 | | | | | +75 | | | +55 | | 33+35+53+55 |
| 57 | +57 | | | | | | | | | | 31+33+35+37+51+53+55+57 |
| 75 | +75 | | | | | | | | | | 13+33+15+35+53+73+55+75 |
| 77 | +77 | | | | | | | | | | 11+13+31+33+15+17+35+37 +51+53+71+73+55+57+75+77 |

CUMULATIVE ADDITION/SUBTRACTION UNITS

INPUT DATA

TWO-DIMENSIONAL DISCRETE COSINE TRANSFORM COMPUTING CIRCUIT

BACKGROUND OF THE INVENTION

1. Field of the Invention

The present invention relates to a two-dimensional discrete cosine transform computing circuit which is used in high-efficiency encoding of image information and the like.

When either transmitting or storing image information, efforts are made to reduce the amount of information so as to improve the efficiency of transmission or reduce the amount of information. High-efficiency encoding methods for reducing the amount of information can be divided into predictive encoding, transformation encoding, vector quantization, and so on. Of these methods, the Hadamard transform, the K-L transform, and the discrete cosine transform (DCT) and the like are known, and in each of these an orthogonal transformation is used to remove spatial correlation.

Of the transformation is encoding methods, the discrete cosine transformation gaining most attention, that is a system for performing a 2-dimensional discrete cosine transform (2-D DCT) with respect to small sub-blocks of (M*M) pixels divided from an image having been adopted by the JPEG (Joint Photographic Image Coding Experts Group) of static image compression international standards organization, the MPEG1 (Moving Picture Image Coding Experts Group Phase 1) which deals with moving image compression coding, and the ITU-TS recommendation H.261. In addition, work is proceeding on MPEG2, which is an extension of MPEG1. Because the two-dimensional discrete cosine transform, which performs 2-D processing includes matrix computations, there is an extremely large amount of calculations performed, and the circuit scale becomes large. Because of this, it is necessary to find a method of reducing the size of the circuit.

2. Description of the Related Art

As described above, the two-dimensional discrete cosine transformation (hereinafter referred to as DCT) is employed in encoding image information, with an inverse 2-D DCT employed in decoding. For example, with regard to a block of (M*M) pixels, if [G] is the two-dimensional DCT of [g], the (u, v) elements of [G], that is $(G_{u,v})$ are expressed as shown in Equation (1). Where, u, v=0, 1, 2, . . . (M-1), and c(k), that is, c(u) and c(v) are conditions given by Equation (2).

$$G_{u,v} = \quad (1)$$

$$\frac{2c(u)c(v)}{M} \sum_{m=0}^{M-1} \sum_{n=0}^{M-1} g_{m,n} \cos\left[\frac{(2m+1)u\pi}{2M}\right] \cos\left[\frac{(2n+1)v\pi}{2M}\right]$$

$$c(k) = \begin{cases} \frac{1}{\sqrt{2}} & k=0 \\ 1 & k=1,2,\ldots(M-1) \end{cases} \quad (2)$$

In the same manner, since the elements (m,n) of [g] are the inverse two-dimensional DCT of [G], they are expressed by Equation (3). In this case, Gu,v are the DCT coefficients.

$$g_{m,n} = \quad (3)$$

$$\frac{2}{M} \sum_{u=0}^{M-1} \sum_{v=0}^{M-1} c(u)c(v)G_{u,v}\cos\left[\frac{(2m+1)u\pi}{2M}\right] \cos\left[\frac{(2n+1)v\pi}{2M}\right]$$

While DCT or inverse DCT computations can be performed by simply executing Equation (1) or Equation (3), this involves matrix computations, making the amount of computation extremely large. Because of this problem, there have been proposals of methods of transforming the two-dimensional calculations to single-dimensional calculations. The MPEG1 is being extended to the MPEG2, which is applicable to the encoding of image signals of the HDTV (High Definition Television) system. The amount of calculations for a two-dimensional DCT applied to this MPEG2 is a number of times the amount in the case of MPEG1.

As described above, while it is possible to shrink the size of the circuit by simplifying the two-dimensional calculations into single-dimensional calculations, this prevented modular circuit implementation, making the achievement of an expandable configuration difficult. With regard to algorithms as well, there are no optimized algorithms, so that making the configuration applicable to MPEG2 makes shrinking the circuit size difficult.

Because of these shortcomings, a high-speed algorithm for performing the two-dimensional calculation directly, without simplification from two dimensions to one dimension, was proposed by M. A. Haque. In this case, only the high-speed algorithm was disclosed. If that algorithm is implemented as is with a circuit, however, it is not possible to reduce the scale of the circuit.

SUMMARY OF THE INVENTION

An object of the present invention is to reduce the scale of the circuit while performing high-speed processing.

To achieve the above object, the present invention has a transform block which has a multiplication unit and a Hadamard transform unit, which performs a DCT calculation process in a sequence of Hadamard transforms, followed by multiplications. The transform block also performs an inverse DCT (IDCT) process in a sequence of multiplications followed by Hadamard transforms. The invention also has a memory block which temporarily stores the input and output data of the process performed by the transform block, an input/output processing block which performs pre-processing and post-processing, such as cumulative addition/subtraction of the input and output data of the transform block, and a control block which controls the multiplication coefficients for the transform block in performing DCT or IDCT calculations, read/write control of the memory block, and control of the input/output processing block.

BRIEF DESCRIPTION OF THE DRAWINGS

The above-noted object and features of the present invention will be more apparent from the following description of the preferred embodiments, with reference being made to the accompanying drawings, wherein:

FIG. 4 is a drawing which illustrates the transform block and the memory block of an embodiment of the present invention;

FIG. 10 is a drawing which shows the processing performed by the input/output processing unit of an embodiment of the present invention;

DESCRIPTION OF THE PREFERRED EMBODIMENT

The embodiments of the present invention will be described next, with reference made to the related drawings.

Figure 1:
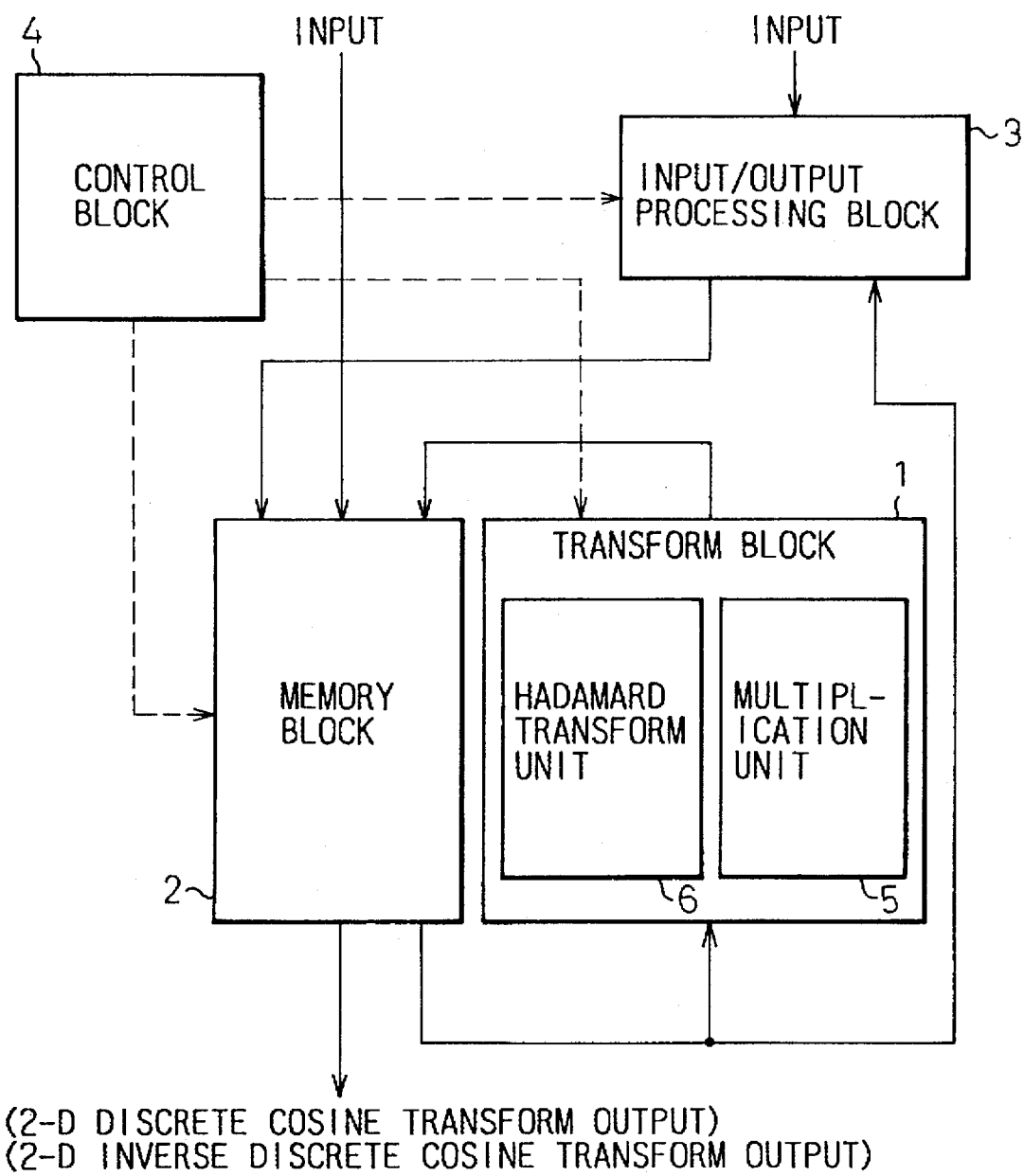
FIG. 1 is a drawing illustrating the principle of the present invention.

Referring to FIG. 1 in describing a two-dimensional DCT computing circuit according to the present invention, the two-dimensional DCT computing circuit has a transform block 1 including a multiplication unit 5 and a Hadamard transform unit 6, which perform a DCT calculation process in a sequence of Hadamard transforms, followed by multiplications and perform an inverse DCT (IDCT process in a sequence of multiplications followed by Hadamard transforms. The computing circuit also has a memory block 2, which temporarily stores input and output data of the transform block 1 and which also reads out written data in rearranged form, an input/output processing block 3, which performs pre-processing and post-processing of input/output data of the transform block 1, and a control block 4 which controls the multiplication coefficients for the transform block 1 in performing DCT or IDCT calculations, read/write address control of the memory block 2, control of the input/output processing block 2, and repeated processing of the two-dimensional DCT or IDCT.

The transform block 1 is comprised of parallel 4-input/ 4-output transform units, each including a Hadamard transform unit formed from a plurality of multiplication units and a plurality of addition/subtraction units.

The memory block 2 is divided into a plurality of memory units, the parallel output data from the transform block 1 being distributed among the memory units for simultaneously writing and simultaneous readout from the memory units into the input of the transform block 1.

The input/output processing block 3 includes a cumulative operation unit which performs a plurality of cumulative addition/subtraction operations, and a selector unit which selects and outputs output data from each cumulative operation unit.

The transform block 1 includes a multiplication unit 5 and a Hadamard transform unit 6 for the purpose of performing the DCT or IDCT calculations, the DCT calculations being performed in a sequence of Hadamard transforms followed by multiplications, and the IDCT calculations being performed in a sequence of multiplications followed by Hadamard transforms. Output data transformed by the first transform processing is applied to the memory block 2, and the output data from the memory block 2 in rearranged form is input to the transform block 1 to perform second transform processing, so that desired calculation processing is performed repeatedly via the memory block 2. The input/output processing block 3 performs modifications and the like on the transformed output. The control block 4 controls the various blocks, causing the execution of calculations for either a two-dimensional DCT or two-dimensional IDCT.

The transform block 1 can be provided with parallel 4-input/4-output transform units each including a Hadamard transform unit which is formed from a plurality of multiplication units and a plurality of addition/subtraction units, so that in the example of a block of (8*8) pixels, 16 transform units are provided.

By dividing the memory block 2 into a plurality of memory units, and distributing the parallel output data from the transform block 1 to each of these memory units, simultaneous writing is performed. The simultaneously read out data from each of the memory units are input to the transform block 1.

The input/output processing block 3 is formed by a cumulative operation unit, which performs cumulative additions and subtractions, and a selector unit, so that if, for example, the two-dimension IDCT processing is being performed, the required data from the serially input data is cumulatively added, and one of the resulting added outputs is selected by the selector unit and taken as the first input data to the above-noted transform block 1.

Figure 2:
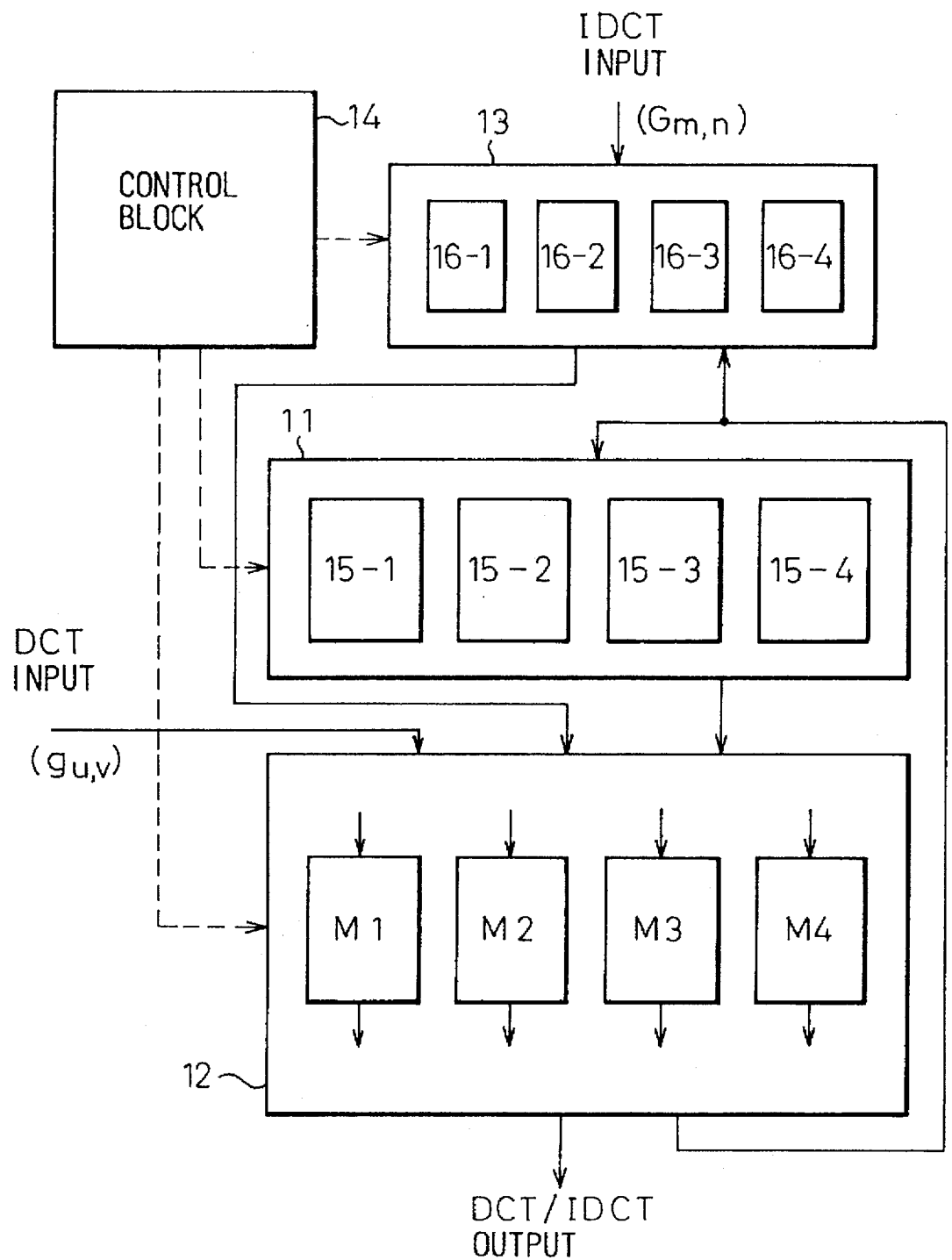
FIG. 2 is a drawing illustrating an embodiment of the present invention.

FIG. 2 is a drawing which shows an embodiment of the present invention, in which the numeral 11 denotes a transform block, 12 is a memory block, 13 is an input/output processing block, 14 is a control block, 15-1 through 15-4 are multiplication/Hadamard transform blocks, 16-1 through 16-4 are cumulative addition/subtraction units, and M1 through M4 are memory units. The control block 14 performs control of the various blocks (11, 12, and 13) in accordance with either two-dimensional DCT or IDCT calculation processing.

First, the direct two-dimensional calculation algorithm noted above and proposed by M. A. Haque will be described. Eliminating the scaling parts of the above-noted Equation (3), that is, (2/M), c(u), and c(v), the equation can be expressed as shown in Equation (4). Equation (5) shown below indicates the coefficients of Equation (4).

$$g_{m,n} = \sum_{u=0}^{M-1} \sum_{v=0}^{M-1} G_{u,v} C_{2M}^{(2m+1)u} C_{2M}^{(2n+1)v} \quad (4)$$

$$C_y^x = \cos\left[\frac{x}{y} \pi\right] \quad (5)$$

The above-noted Equation (4) can be divided as shown in Equation (6) given below. The terms on the right side of Equation (6) are given by the Equations (7) to (10), respectively.

$$g_{m,n} = g_{m,n}^{ee} + g_{m,n}^{eo} + g_{m,n}^{oe} + g_{m,n}^{oo} \quad (6)$$

where $$g_{m,n}^{ee} = \sum_{u=0}^{M/2-1} \sum_{v=0}^{M/2-1} G_{2u,2v} C_{2M}^{(2m+1)2u} C_{2M}^{(2n+1)2v} \quad (7)$$

$$g_{m,n}^{eo} = \sum_{u=0}^{M/2-1} \sum_{v=0}^{M/2-1} G_{2u,2v-1} C_{2M}^{(2m+1)2u} C_{2M}^{(2n+1)(2v+1)} \quad (8)$$

-continued $$g_{m,n}^{oe} = \sum_{u=0}^{M/2-1} \sum_{v=0}^{M/2-1} G_{2u+1,2v} C_{2M}^{(2m+1)(2u+1)} C_{2M}^{(2n+1)2v} \quad (9)$$

$$g_{m,n}^{oo} = \sum_{u=0}^{M/2-1} \sum_{v=0}^{M/2-1} G_{2u+1,2v+1} C_{2M}^{(2m+1)(2u+1)} C_{2M}^{(2n+1)(2v+1)} \quad (10)$$

Specifically, the above-noted Equations (7) to (10) represent even-even, even-odd, odd-even, and odd-odd transforms, respectively, of size (M/2)*(M2). Equation (7) indicates an inverse DCT of size (M/2)*(M2). Equation (8) can be transformed as shown by Equation (11), and it can be seen that is, in the same manner, an IDCT of size (M/2)*(M/2). In this case, the equality given by Equation (12) and $G_{2u,-1}=0$ were used.

$$g_{m,n}^{eo} = \quad (11)$$

$$\frac{1}{2C_{2N}^{(2n+1)}} \sum_{u=0}^{M/2-1} \sum_{v=0}^{M/2-1} G_{2u,2v+1} C_M^{(2m+1)u} [C_M^{(2n+1)(v+1)} + C_M^{(2n+1)v}] =$$

$$\frac{1}{2C_{2M}^{(2n+1)}} \sum_{u=0}^{M/2-1} \sum_{v=0}^{M/2-1} [G_{2u,2v-1} + G_{2u,2v+1}] C_M^{(2m+1)u} C_M^{(2n+1)v}$$

$$2C_{2M}^{(2n+1)(2v+1)} C_{2M}^{(2n+1)} = C_M^{(2n+1)(v+1)} + C_M^{(2n+1)v} \quad (12)$$

Equations (9) and (10) can also be transformed as shown in Equations (13) and (14), respectively.

$$g_{m,n}^{oe} = \frac{1}{2C_{2M}^{(2n+1)}} \sum_{u=0}^{M/2-1} \sum_{v=0}^{M/2-1} [G_{2u-1,2v} + G_{2u+1,2v}] C_M^{(2m+1)u} C_M^{(2n+1)v} \quad (13)$$

$$g_{m,n}^{oo} = \frac{1}{4C_{2M}^{(2n+1)} C_{2M}^{(2n+1)}} \times \quad (14)$$

$$\sum_{u=0}^{M/2-1} \sum_{v=0}^{M/2-1} [G_{2u-1,2v-1} + G_{2u-1,2v+1} + G_{2u+1,2v-1} + G_{2u+1,2v+1}]$$

$$C_M^{(2m+1)u} C_M^{(2n+1)v}$$

As described above, the above-noted Equations (7) to (10) express the inverse DCT of (M/2)* (M/2), so that it can be seen that an IDCT of an M*M block can be divided into four IDCTs of (M/2)*(M/2).

Further, Equations (15) and (16) shown below are obtained.

$$C_{2M}^{[2(M-n-1)+1](2v)} = C_{2M}^{(2n+1)(2v)} \quad (15)$$

$$C_{2m}^{[2(M-n-1)+1](2V+1)} = -C_{2M}^{(2n+1)(2V+1)} \quad (16)$$

From these equations, the elements $g_{m,n}$ which construct the input matrix of the DCT can be divided by means of Equation (6), thereby deriving the following Equations (17) to (20).

$$g_{m,n} = g_{m,n}^{ee} + g_{m,n}^{eo} + g_{m,n}^{oe} + g_{m,n}^{oo} \quad (17)$$

$$g_{m,M-n-1} = g_{m,n}^{ee} - g_{m,n}^{eo} + g_{m,n}^{oe} - g_{m,n}^{oo} \quad (18)$$

$$g_{m-m-1,n} = g_{m,n}^{ee} + g_{m,n}^{eo} - g_{m,n}^{oe} - g_{m,n}^{oo} \quad (19)$$

$$g_{M-m-1,M-n-1} = g_{m,n}^{ee} - g_{m,n}^{eo} - g_{m,n}^{oe} + g_{m,n}^{oo} \quad (20)$$

These Equations (17) to (20) can be expressed as a block matrix equation as shown in Equation (21).

$$\begin{bmatrix} [g_{m,n}] \\ [g_{m,M-n-1}] \\ [g_{M-m-1,n}] \\ [g_{M-m-1,M-n-1}] \end{bmatrix} = \begin{bmatrix} 1 & 1 & 1 & 1 \\ 1 & -1 & 1 & -1 \\ 1 & 1 & -1 & -1 \\ 1 & -1 & -1 & 1 \end{bmatrix} \begin{bmatrix} [g^{ee}] \\ [g^{eo}] \\ [g^{oe}] \\ [g^{oo}] \end{bmatrix} \quad (21)$$

The elements $[g^{ee}]$, $[g^{eo}]$, $[g^{oe}]$, and $[g^{oo}]$ of the block matrix of Equation (21) represent, as shown by Equations (7), (11), (13), and (14), inverse DCTs of size (M/2)*(M/2). This simplification method is an asymptotic algorithm that can be repeatedly applied until reduction to a (2*2) block is achieved.

Figure 3A:
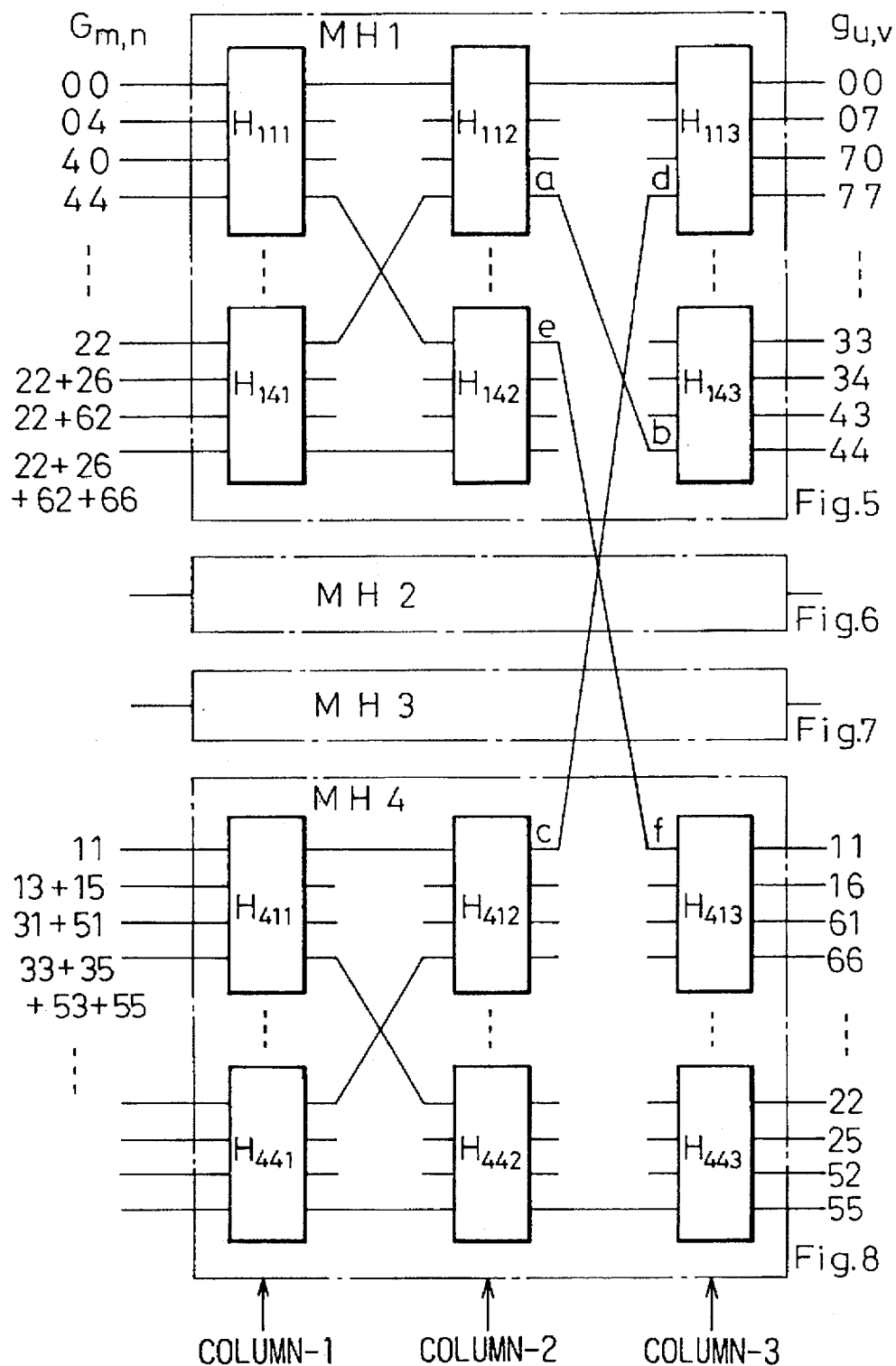
FIG. 3A is a simplified drawing illustrating the signal flow.

FIG. 3A shows a simplified view of the signal flow in the case in which an IDCT is performed with M=8. In this case, $H_{111}$ to $H_{443}$ are the transform units each including the (4*4) Hadamard unit and multiplication unit of Equation (22).

$$H = \begin{bmatrix} 1 & 1 & 1 & 1 \\ 1 & -1 & 1 & -1 \\ 1 & 1 & -1 & -1 \\ 1 & -1 & -1 & 1 \end{bmatrix} \quad (22)$$

In FIG. 3A, 00 to 77 on the right side indicate the u and v of $g_{u,v}$, while 00 to 44 on the left side indicate the m and n of $G_{m,n}$. In addition, referring to FIG. 8, 02+06 for example on the left side indicates $G_{02}+G_{06}$, while 22+26+62+66 indicates $G_{22}+G_{26}+G_{62}+G_{66}$. That is, the summing sign indicates addition of $G_{m,n}$, this addition being possible in the input/output processing block 13. In the case of DCT processing, subtraction processing is used to cause decomposition of $G_{m,n}$. The MH1 to MH4 indicate multiplication/Hadamard blocks.

The Hadamard transform has the following property.

$$[H]^*[H] = 4[I] \quad (23)$$

In the above, [I] is a unit matrix indicated as follows in Equation (24).

$$I = \begin{bmatrix} 1 & 0 & 0 & 0 \\ 0 & 1 & 0 & 0 \\ 0 & 0 & 1 & 0 \\ 0 & 0 & 0 & 1 \end{bmatrix} \quad (24)$$

Because of this relationship, the Hadamard transform is reversible. That is, if $\vec{x}$ is the vector x and $\vec{y}$ is the vector y, $(\vec{y})=H(\vec{x})$ is equivalent to $(\vec{x})=H(\vec{y})/4$. This is equivalent to switching the computing order of the Hadamard transforms and multiplications between the DCT and the IDCT. Note, however, that the coefficients in the multiplications are different. In the signal flow shown in FIG. 3A, by making the left side the input side, the output from the right side is the IDCT, and by making the right side the input side, the output from the left side is the DCT.

While an arrangement of the transform units $H_{111}$ to $H_{443}$ can be envisioned according to the signal flow shown in FIG. 3A, the scale of the circuit will become large. Because of this problem, in the present invention, a memory block 12 such as shown in FIG. 2 is provided, so that the transform block 11 is used repeatedly in performing the DCT or IDCT process. That is, the data output from the transform block 1 the first time is input to the memory block 12, the output data from that memory block 12 being input to the transform block 11, which is the execution of the second computing processing, the resulting output being again input to the memory block 12, the data read out from the memory block 12 being then input again to the transform block 11 for the third computing processing.

Figure 3B:
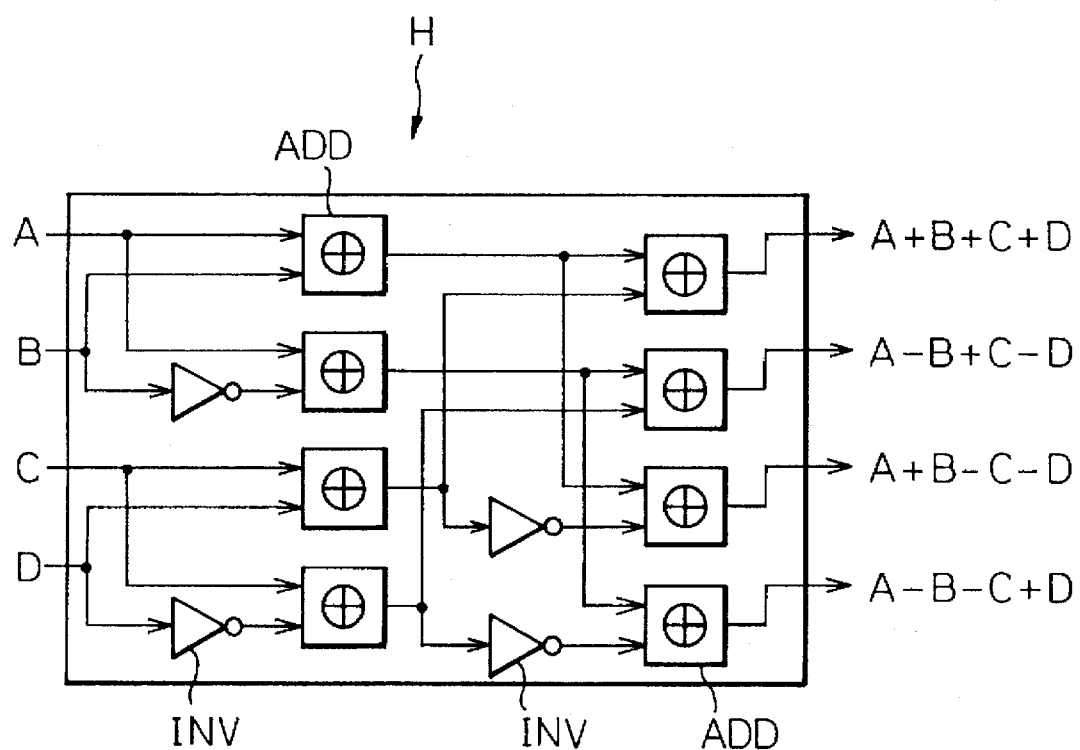
FIG. 3B is a drawing which shows an example of the configuration of the transform unit (H) shown in FIG. 3A.

FIG. 3B is a drawing which shows an example of the configuration of the transform unit (H) shown in FIG. 3A. In this drawing, the transform unit (H) is a logic circuit formed by a plurality of inverters INV and a plurality of adders ADD. When the inputs A, B, C, and D are input from the left side of the drawing, the four outputs at the right Side (A+B+C+D) to (A−B−C+D) are obtained according to four different logic rules.

FIG. 4 is a block diagram which illustrates the transform and memory blocks of an embodiment of the present invention. Next, the case of performing a DCT or an IDCT computing processing with a (8*8) block will be described. In this drawing, 15-1 to 15-4 are multiplication/Hadamard blocks, 15-11 to 15-44 are transform units, M1 to M4 are memory units, and 21 and 22 are selector units.

Because the computing processing for a DCT or IDCT with a block size of (8*8) can be performed as described above directly as a two-dimensional calculation with respect to (4*4), it is possible to have the transform units 15-11 to 15-44 include multipliers and adders, this being configured as a 4-input/4-output circuit which performs multiplication of coefficients and a Hadamard transform on a (4*4) block. For example, transform unit 15-11 is a single unit which includes the first, second, and third stage $H_{111}$, $H_{112}$, and $H_{113}$ shown in the signal flow of FIG. 3A, while transform unit 15-14 is a single unit which includes the $H_{141}$, $H_{142}$, and $H_{143}$. The memory units M1 to M4 are indicated for the case in which the address range is 0 to 15.

FIGS. 5 to 8 show the relationship between the signal flow in the multiplication/Hadamard transform blocks 15-1 to 15-4 to the memory addresses of memory blocks M1 to M4, this indicating in detail the correspondence between the signal flow of FIG. 3A and the multiplication/Hadamard transform blocks 15-1 to 15-4. WA indicates the write address of memory units M1 to MR, 1-0 being address 0 of memory unit 1, while 4-15 indicates address 15 of memory unit 4.

The interconnectional relationship between the first and second stages is the same in each of the multiplication/ Hadamard transform blocks 15-1 to 15-4, while the interconnectional relationship differs between the second and third stages, the numbers in parentheses indicating connections between these numbers. For example, a→b of FIG. 3A corresponds to ((4) of $H_{112}$ in FIG. 5) →((4) of $H_{143}$ in FIG. 5), c→d of FIG. 3A corresponds to ((49) of $H_{412}$ in FIG. 8)→((49) of $H_{113}$ in FIG. 5), and e →f in FIG. 3A corresponds to ((13) of $H_{142}$ in FIG. 5)→((13) of $H_{413}$ in FIG. 8). That is, the above-noted (4) and (4), (49) and (49), and (13) and (13) are each connected by one line.

The multiplication coefficients A, C11, C21, C23, C31, C33, C35, and C37 indicated at the left side of $H_{111}$ to $H_{143}$ are as follows.

$A = 2^{-\frac{1}{2}}$
$C11 = \frac{1}{2} \cos(\pi/4)$
$C21 = \frac{1}{2} \cos(\pi/8)$
$C23 = \frac{1}{2} \cos(3\pi/8)$
$C31 = \frac{1}{2} \cos(\pi/16)$
$C33 = \frac{1}{2} \cos(3\pi/16)$
$C35 = \frac{1}{2} \cos(5\pi/16)$
$C37 = \frac{1}{2} \cos(7\pi/16)$ For example, in the case of the IDCT, $G_{00}$, $G_{04}$, $G_{40}$, and $G_{44}$ are input to the transform unit 15-11 shown in FIG. 4, $G_{02}$, $G_{02}+G_{06}$, $G_{42}$, and $G_{42}+G_{46}$ are input to the transform unit 15-12, $G_{20}$, $G_{24}$, and $G_{20}+G_{60}$ are input to the transform unit 15-13, a $G_{22}$, $G_{22}+G_{26}$, $G_{22}+G_{62}$, and $G_{22}+G_{26}+G_{62}+G_{66}$ are input to transform unit 15-14.

This done, the multiplications of $G_{00}*0.5$, $G_{04}*A*C11$, $G_{40}*A*C11$, and $G_{44}C11*C11$ are each performed and the Hadamard transform is performed. The thus transformed output data are written into the memory unit M1 to M4 at addresses 1-0, 2-1, 3-2, and 4-3, that is, into the address 0 of memory unit M1, the address 1 of memory unit M2, the address 2 of memory unit M3, and the address 3 of memory unit M4. The multiplications and Hadamard transform processing proceeds in a like manner thereafter, the results being written into memory units M1 to M4.

In this case, parallel data output from transform units 15-11 to 15-14 of the multiplication/Hadamard transform block 15-1 passes through the selector unit 21 and is distributed among the memory units M1 to M4 and written therein. Next, parallel output data from the transform units 15-21 to 15-24 of the multiplication/Hadamard transform block 15-2 passes through the selector unit 21 and is distributed among the memory units M1 to M4 and written therein. In the same manner, the transformed data from each of the transform units 1-31 to 15-34 and 15-41 to 15-44 of the multiplication/Hadamard transform blocks 15-3 and 15-4, respectively, are passed through the selector unit 21 and distributed and written into the memory units M1 to M4.

Figure 5:
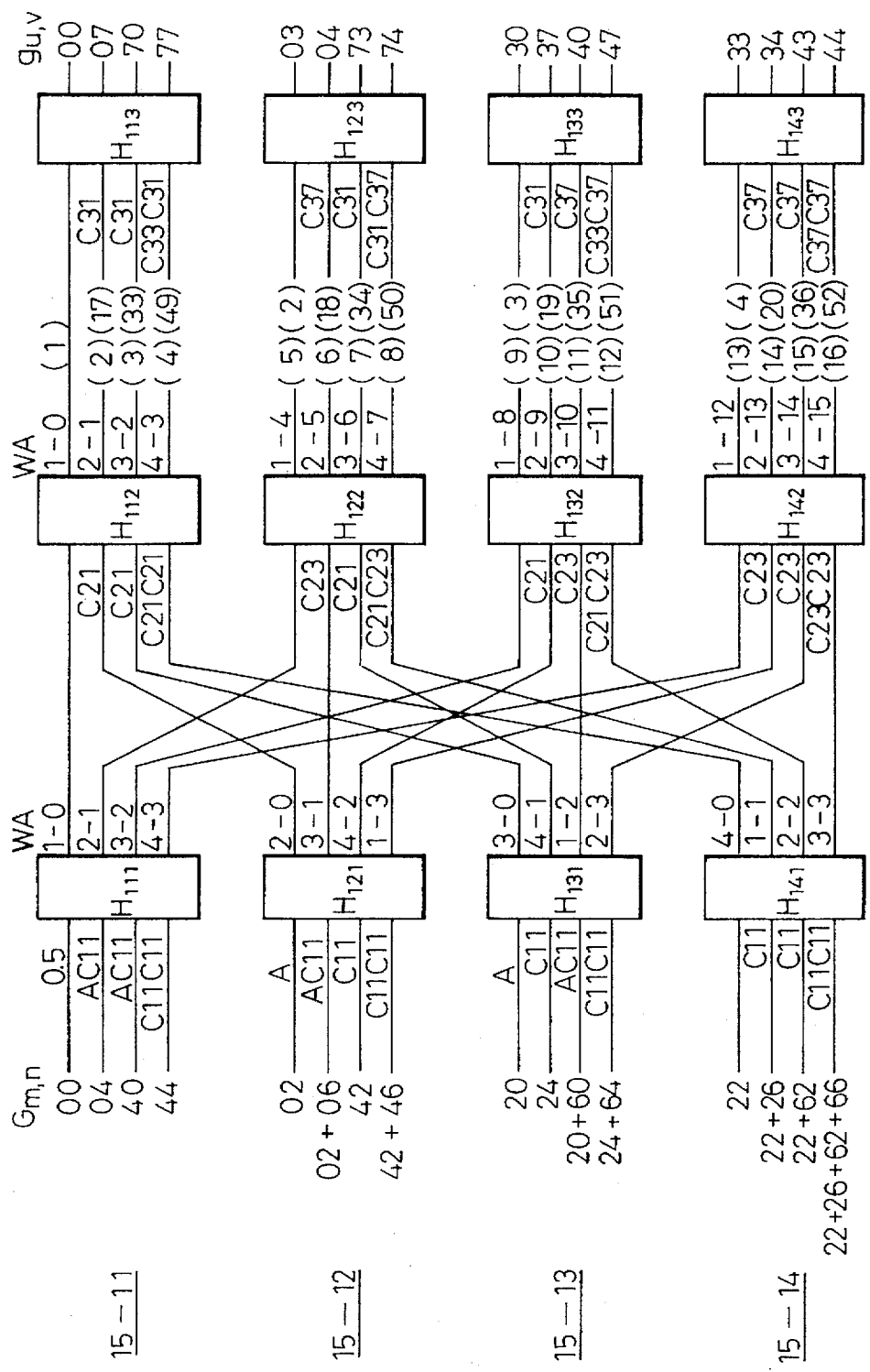
FIG. 5 is a drawing which shows the signal flow and memory addresses.

When the first computing processing is completed, the data at address 0 from each of the memory units M1 to M4, as indicated by the connections shown between $H_{111}$ to $H_{141}$ and $H_{112}$ in FIG. 5, are passed through the selector unit 22 and are applied to the transform unit 15-11 (corresponding to $H_{112}$), multiplication and Hadamard transforms are performed therein, and the resulting transformed data is passed through the select unit 21 and distributed and written into the memory units M1 to M4. The addresses WA of the memory unit M1 to M4 in doing this are, as indicated at the right side of $H_{112}$, $H_{122}$, $H_{132}$, and $H_{142}$ in FIG. 5, addresses 0, 4, 8, and 12 of the memory unit M1, addresses 1, 5, 9, and 13 of the memory unit M2, addresses 2, 6, 10, and 14 of the memory unit M3, and addresses 3, 7, 11, and 15 of the memory unit M4.

The data read out from address 1 of each of the memory units M1 to M4, as indicated by the connections shown between $H_{111}$ to $H_{141}$ and $H_{22}$ in FIG. 5, are passed through the selector unit 22 and are applied to the transform unit 15-12 (corresponding to $H_{22}$), multiplications of coefficients and Hadamard transforms are performed, and the resulting transformed data is passed through the selector unit 21 and distributed and written into the memory units M1 to M4. Thereafter in the same manner, the data read out from address 2 and address 3 of the memory units M1 to M4 are passed through the selector unit 22 and applied to the transform units 15-13 and 15-14, multiplications of coefficients and Hadamard transforms are performed, and the results are passed through the selector unit 21 and written into the memory units M1 to M4.

Figure 6:
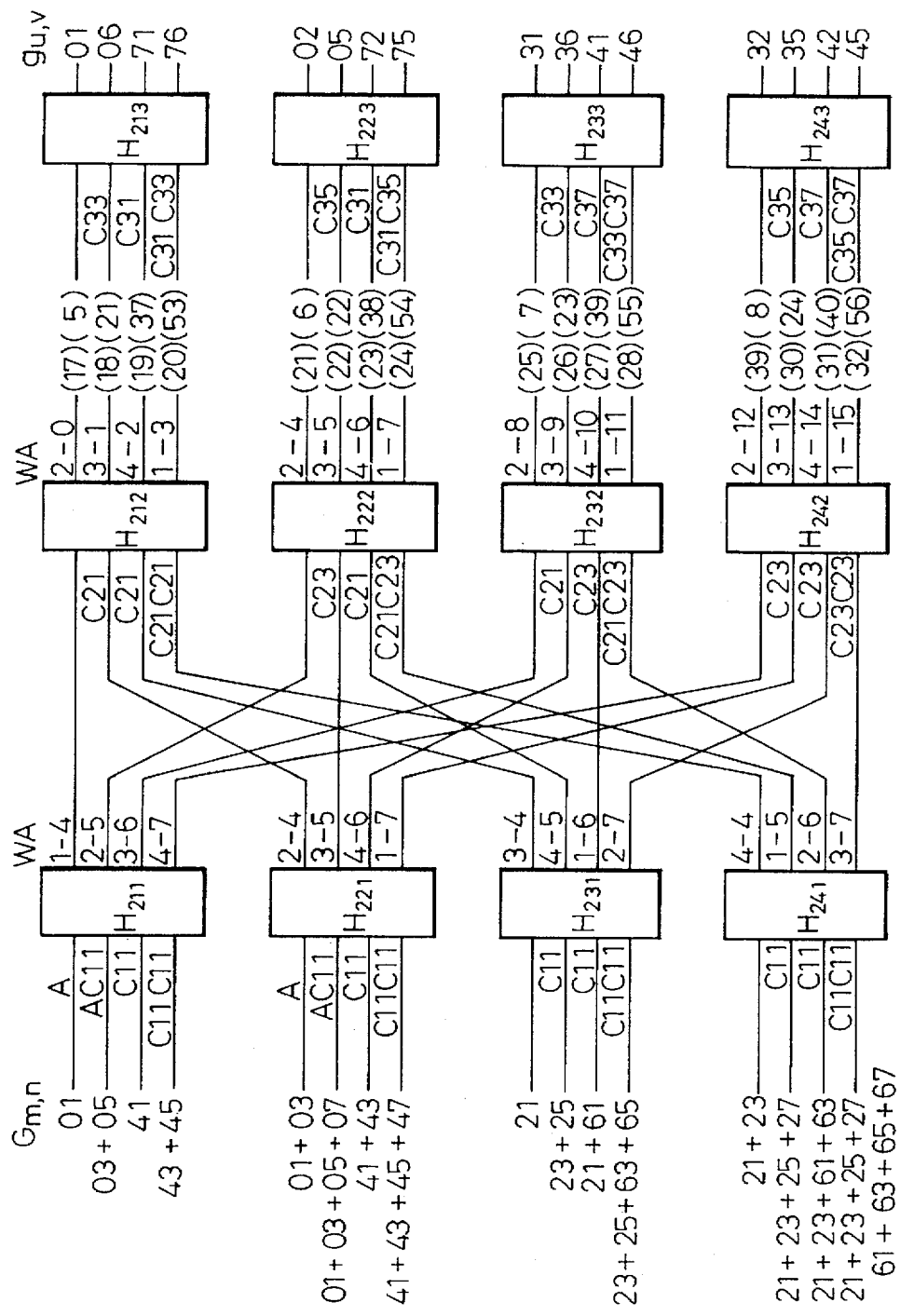
FIG. 6 is a drawing which shows the signal flow and memory addresses.
Figure 7:
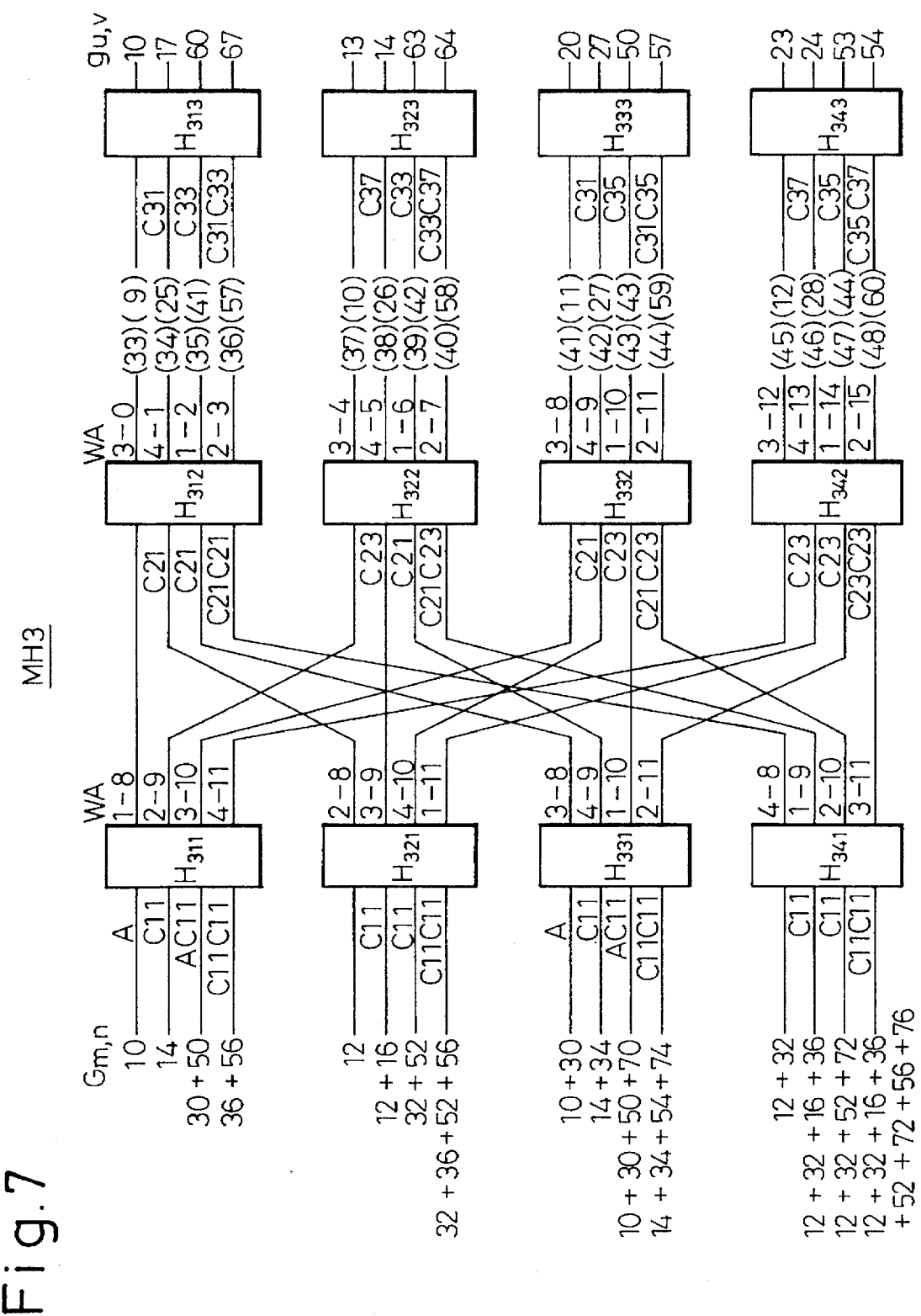
FIG. 7 is a drawing which shows the signal flow and memory addresses.
Figure 8:
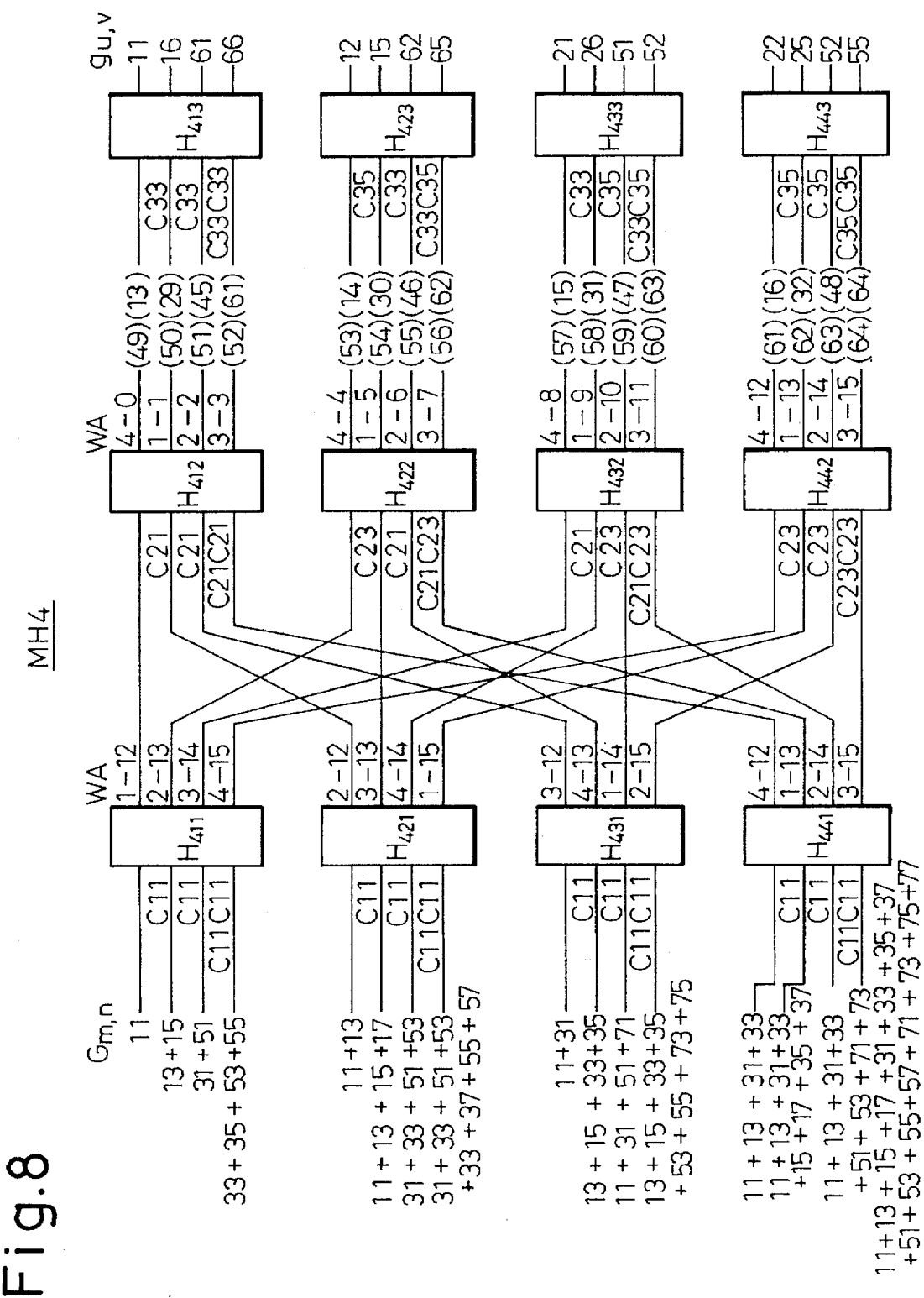
FIG. 8 is a drawing which shows the signal flow and memory addresses.

In the other multiplication/Hadamard transform blocks 15-2 to 15-4 as well, according to the connections between the first and second stages as shown in FIG. 6 to FIG. 8, selector unit 22 applies the data read out from the memory units M1 to M4 to the transformunits 15-21 to 15-24, 15-31 to 15-34, and 15-41 to 15-44, multiplications of coefficients and Hadamard transforms are performed, the resulting transformed data being passed through the selector unit 21 and written into the memory units M1 to M4.

When the second computing processing is completed, the data read out from memory units M1 to M4 is again passed through the selector unit 22 according to the connections between the second and third stages shown in FIG. 5 to FIG. 8, and applied to each of the transform units of the multiplication/Hadamard transform blocks 15-1 to 15-4, whereat multiplication of coefficients and Hadamard transforms are performed, whereby the transformed data $g_{u,v}$ is obtained. In this case, $g_{00}$, $g_{07}$, $g_{70}$, and $g_{77}$ are obtained from transform unit 15-11, $g_{03}$, $g_{04}$, $g_{73}$, and $g_{74}$ are obtained from transform unit 15-12, $g_{30}$, $g_{37}$, $g_{40}$, and $g_{47}$ are obtained from transform unit 15-13, and $g_{33}$, $g_{34}$, $g_{43}$, and $g_{44}$ are obtained from transform unit 15-14.

Because the transformed data $g_{00}$ to $g_{77}$ from each of the transform units 15-11 to 15-44 are not in the required matrix sequence, that is, not in the sequence 00, 01, 02, and so on, these are temporarily stored in the memory units M1 to M4 and then output in the required sequence. In the configuration shown in FIG. 4, by having four memory units M1 to M4 correspond to the four transform blocks, and by having the four transformed output data from one multiplication/Hadamard transform block distributed and written simultaneously, with four memory units being provided to correspond to each one of the multiplication/Hadamard transform blocks (15-1 to 15-4), it is possible, by causing the four multiplication/Hadamard transform blocks to operate in parallel, to write the transformed parallel data into the memory units simultaneously.

In the case of DCT computing processing, $g_{u,v}$ is temporarily stored in memory units M1 to M4, with processing being performed with a reverse-direction signal flow from that described above. For example, $g_{00}$, $g_{07}$, $g_{70}$, and $g_{77}$ are input to the transform unit 15-11, and after the Hadamard transforms and then multiplications of coefficients are performed, the transformed data is passed through the selector unit 21 and written into the memory units M1 to M4. In the same manner, when the first computing processing is completed, the data read out from memory units M1 to M4 is input to the transform units, the transformed data is written into the memory units M1 to M4, and when the second computing processing is completed, the data read out from the memory units M1 to M& is again input to the transform block, from which transformed data is then again written into the memory units M1 to M4.

In this case, because the outputs of each of the memory units M1 to M4 correspond to the m and n of the $G_{m,n}$ in FIGS. 5 to 8, in multiplication/Hadamard transform block 15-1, for example, $G_{06}$ is obtained by means of a subtraction calculation between $G_{02}$ and $G_{02}+G_{06}$. In the same manner, $G_{46}$ is obtained by means of a subtraction calculation between $G_{42}$ and $G_{42}+G_{46}$. By performing this subtraction calculation in the input/output processing block 13, the DCT of $G_{m,n}$ is obtained from $g_{u,v}$.

Figure 9A:
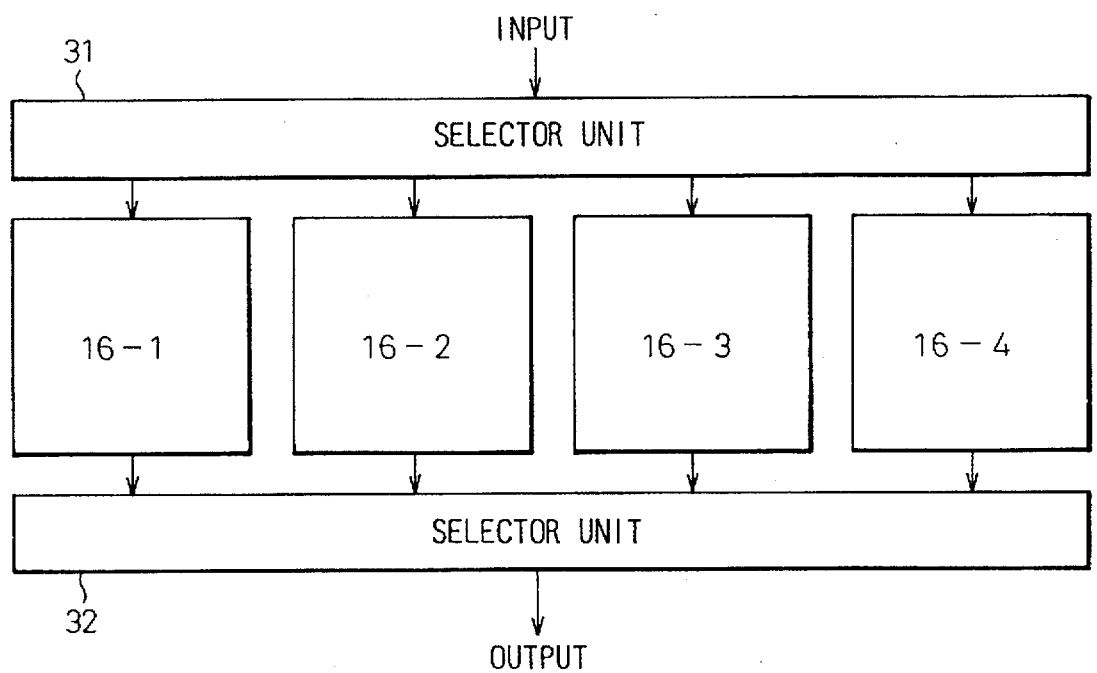
FIG. 9A is a block diagram which shows the input/output processing block of an embodiment of the present invention.

FIG. 9A illustrates the input/output processing block 13 of an embodiment of the present invention, in which numerals 16-1 to 16-4 denote input/output processing units, and 31 and 32 are selector units. These input/output processing units 16-1 to 16-4 are formed by cumulative addition/subtraction units, and when a correspondence is established with respect to the multiplication/Hadamard transform blocks 15-1 to 15-4, they perform the cumulative addition/subtraction of $G_{m,n}$ shown in FIGS. 5 to 8. To enable input/output processing units 16-1 to 16-4 to operate in parallel, the selector unit 31 can distribute input data.

Each of the input/output processing units 16-1 to 16-4 merely has 10 cumulative addition/subtraction units (A) so that, for example, in the case of the IDCT, the input/output processing unit 16-1 inputs to the multiplication/Hadamard transform block 15-11 of the transform block 15-1 via the selector unit 32, the $G_{10}$ and $G_{14}$ (FIG. 7) which are selected by the selector unit 31, together with $G_{30}+G_{50}$ and $G_{36}+G_{56}$, which are obtained by addition in the cumulative addition/subtraction units. In addition, $G_{12}$, together with $G_{12}+G_{16}$, $G_{32}+G_{52}$, and $G_{32}+G_{36}+G_{52}+G_{56}$, which are obtained by addition in the cumulative addition/subtraction units are input via the selector unit 32 to the transform block 15-12.

In this case, $G_{m,n}$ is serially input, and is temporarily stored in sequence into memory block 12 while selecting the cumulative addition/subtraction output of a predetermined $G_{m,n}$, thereby enabling simplification of the configuration of the input/output processing units 16-1 to 16-4. Each of the input/output processing units 16-1 to 16-4 can be configured by, for example, a cumulative addition/subtraction unit and a selector. For example, FIG. 10 (to be described later) shows the processing in the input/output processing unit 16-4 in which there are ten cumulative addition/subtraction units A0 to A9.

Figure 9B:
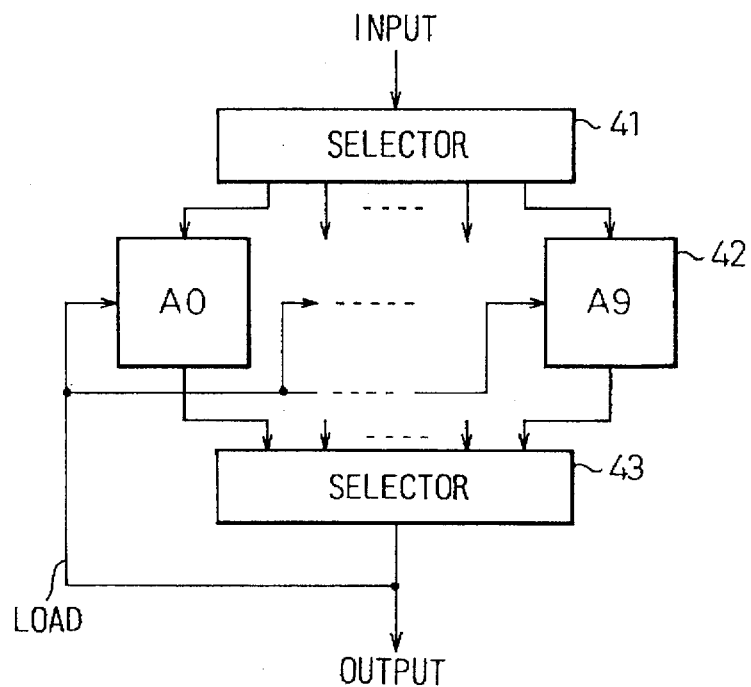
FIG. 9B is a block diagram which shows the configuration shown in FIG. 9A in more detail.

FIG. 9B shows the configuration of FIG. 9A in further detail, in which if we look at the input/output processing unit 16-4 shown in FIG. 9A, for example, this consists of an input-side selector 41, a plurality of cumulative addition/subtraction units (A) 42, and an output-side selector 43 (this being true for the other input/output processing units 16-1 to 16-3 as well), the output from the output-side selector 43 being loaded into the cumulative addition/subtraction units 42.

Figure 9C:
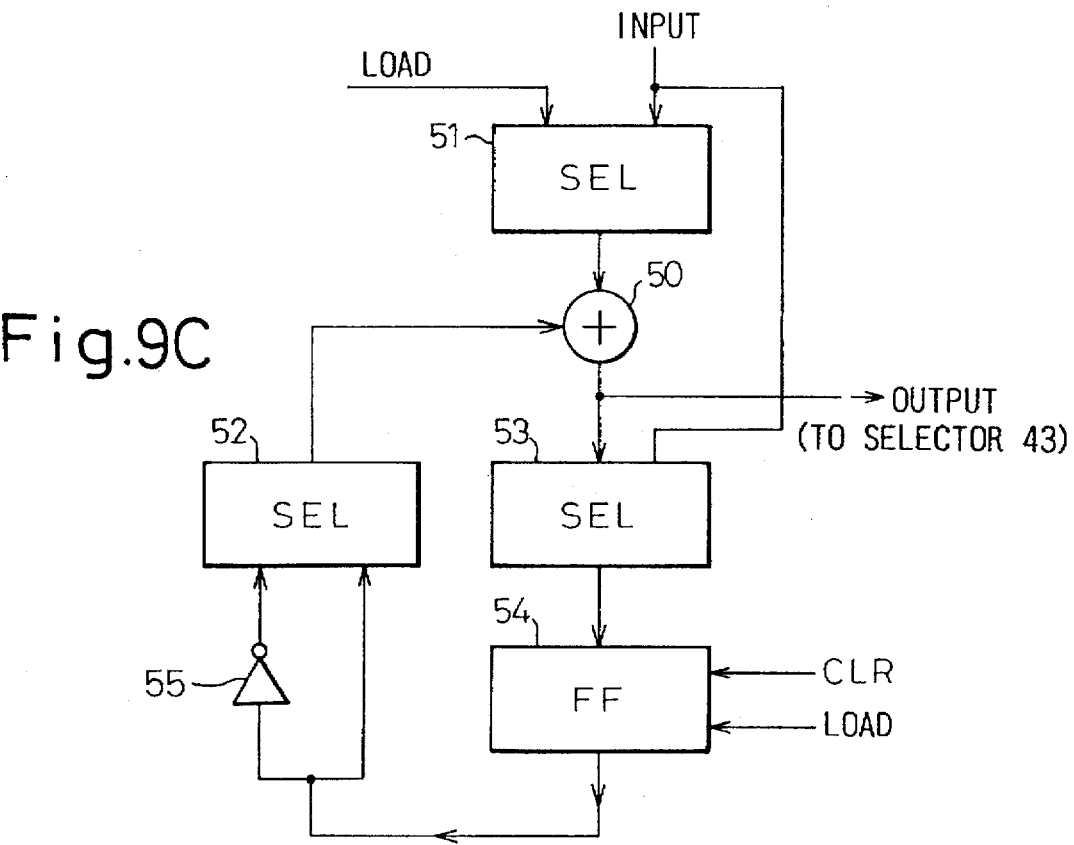
FIG. 9C is a drawing which shows a detailed example of the cumulative addition/subtraction unit shown in FIG. 9B.

FIG. 9C shows a detailed example of the cumulative addition/subtraction units (A) 42 shown in FIG. 9B, in which for example A0 (or A9) consists of an adder 50, first, second, and third selectors (SEL) 51 to 53, a flip-flop (FF) 54 and an inverter 55. The first selector 51 selects either the input (refer to the input data shown in FIG. 10) or the output of the selector 43, and applies this to the adder 50. At the adder 50, the data from the second selector 52 and the output of the first selector 51 are added. The results of this addition are output to the selector 43, and are set into the flip-flop 54 via the third selector 53. Since the data to be added to the input data "11" in FIG. 10 is 0, at the start the flip-flop 5 holds the data 0 by means of a clear signal CLR. The first selector 51 at first selects the line 56.

Thereafter, the output from the adder 50, for example "11+13", "11+31" and so on as shown in FIG. 10, is output via the selector 43, simultaneously with which it is held at the flip-flop 54.

Whether the output of the flip-flop 5 is to be directly applied to the adder 50 or first inverted by inverter 55 and then applied to the adder 50 is determined by the second selector 52. When obtaining DCT data output, if we observe the lower left of FIG. 5, for example, we see that subtractions are required, that is, 22 being subtracted from 22+26 to obtain 26, and 22 being subtracted from 22+62 to obtain 62. In this case, the second selector 52 selects the path to the inverter 55.

Turning to FIG. 10, the input data $G_{11}$, $G_{13}$, $G_{31}$, ..., $G_{77}$ are input at the times t. The first $G_{11}$ is set into the cumulative addition/subtraction units A0, A1, A2, and A4, and is directly taken as the output data $G_{11}$. When the next data $G_{13}$ is input, it is set into the cumulative addition/subtraction units A0, A1, A3, A4, and A5, the results of cumulative addition/subtraction with the previous $G_{11}$ being set into A0, A1, and A4, so that the output data is, for example, the $G_{11}+G_{13}$ of A0.

When the next $G_{31}$ is input, it is input to the cumulative addition/subtraction units A0, A1, A2, A6, A7, and A9, with the results of cumulative addition/subtraction of $G_{11}+G_{31}$ being set into A0 and A1, this $G_{11}+G_{31}$ cumulative addition/subtraction result being taken as the output data. In the same manner thereafter, input data is selectively input to A0 through A9 and cumulatively added/subtracted. By doing this, the cumulative addition/subtraction results are set into A0, this forming the output data, which is input to the transform unit 15-44 of the multiplication/Hadamard transform block 15-4.

In the case of a DCT calculation, since for example the output data of FIG. 10 is input to the input/output processing unit 16-4, in this case $G_{11}$ is taken as is as the output data, with the previous $G_{11}$ being subtracted from $G_{11}+G_{13}$ to obtain the $G_{13}$ output data. With the further previous $G_{11}$ being subtracted from $G_{11}+G_{31}$, the $G_{31}$ output data is obtained. Since $G_{11}$, $G_{13}$, and $G_{31}$ have already been determined, the next $G_{33}$ output data can be determined by subtracting them from $G_{11}+G_{13}+G_{31}+G_{33}$. This can be continued in the same manner to derive the DCT data $G_{m,n}$.

The other input/output processing units 16-1 to 16-3 can be implemented with the same configuration as the input/output processing unit 16-4, with the input/output processing unit 16-1 having the simplest possible configuration.

Figure 11:
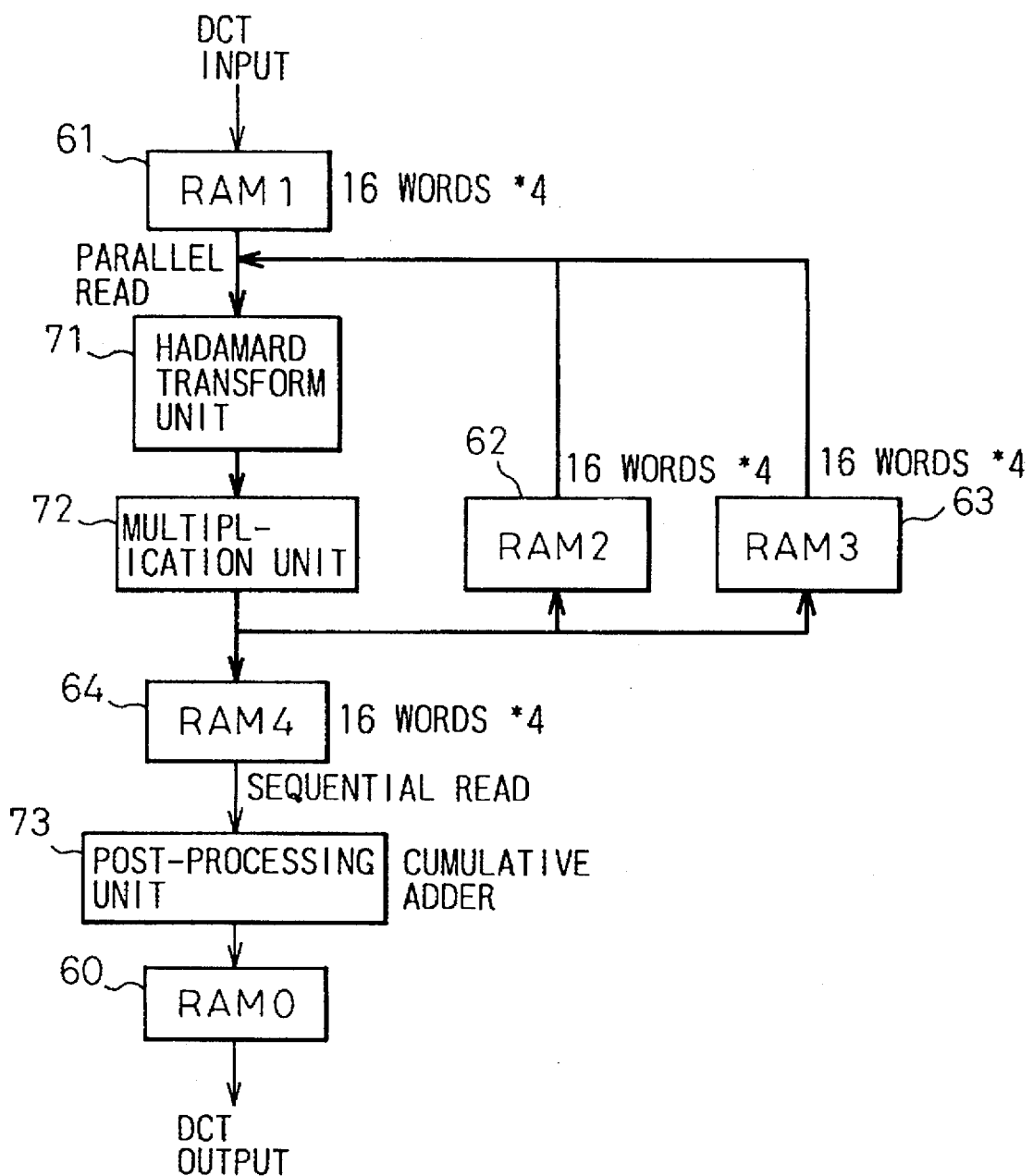
FIG. 11 is a block diagram which shows the configuration of a two-dimensional discrete cosine transform computing circuit of an embodiment of the present invention.
Figure 12:
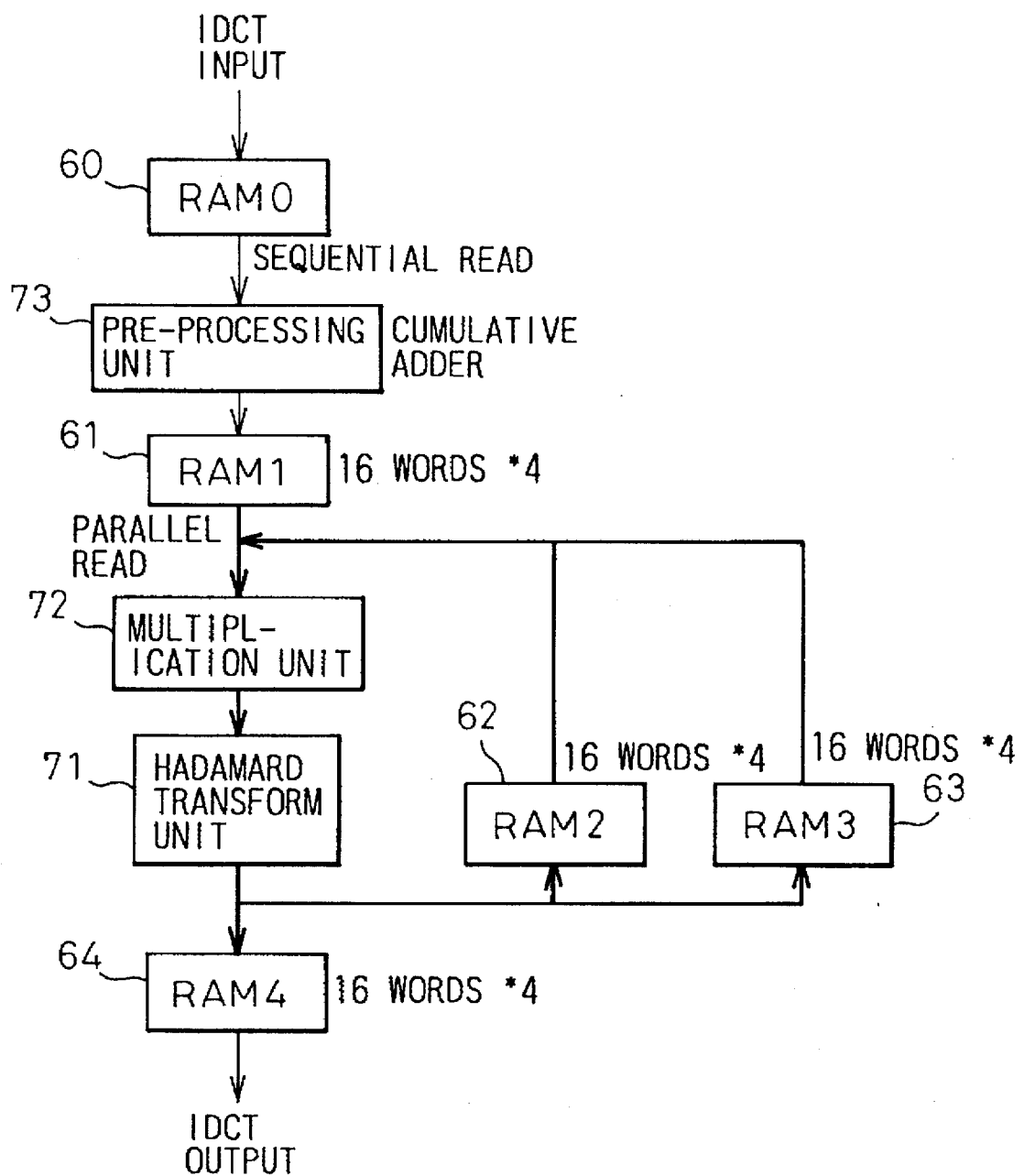
FIG. 12 is a block diagram which shows the configuration of a two-dimensional inverse discrete cosine transform computing circuit of an embodiment of the present invention.

FIG. 11 is a block diagram which shows the configuration of a two-dimensional DCT computing circuit, and FIG. 12 is a block diagram which shows the configuration of a two-dimensional IDCT computing circuit. Referring back to FIG. 2, the circuit of FIG. 11 performs the functions of FIG. 2 for producing DCT output from DCT input, and the circuit of FIG. 12 performs the functions of FIG. 2 for producing IDCT output from IDCT input. The circuit elements of FIG. 11 and the circuit elements of FIG. 12 can be shared elements in the case in which the elements are the same.

In FIG. 11 and FIG. 12 RAM 0(60), RAM 1(61), ..., RAM 4(64) correspond to the memory units M1 to M4 in FIG. 2.

The post-processing unit 73 shown in FIG. 11 and the pre-processing unit 73 shown in FIG. 12 correspond to the cumulative addition/subtraction units 16-1 to 16-4 of the input/output processing block 13 shown in FIG. 2.

The Hadamard transform unit 71 and multiplication unit 72 shown in FIG. 11 and FIG. 12 correspond to the multiplication/Hadamard transform blocks 15-1 to 15-4 shown in FIG. 2 (blocks 6 and 5 in FIG. 1).

As described in detail above, the present invention has a transform block 1 which performs multiplications and Hadamard transforms, a memory block 2, an input/output processing block 3, and a control block 4, and performs two-dimensional DCT transforms and IDCT transforms using direct two-dimensional calculations. By virtue of this configuration, whereby the transform block can be used repeatedly in the transform processing, the invention offers the advantage of a simplified computing circuit. In addition, by changing the sequence of computations, a single configuration can be switched between DCT and IDCT computations. This enables high-speed and economical processing of the DCT and IDCT for the purpose of high-efficiency encoding and decoding of static picture and moving picture image information.

We claim:

1. A two-dimensional discrete cosine transform computing circuit that directly performs two-dimensional computations, which comprises:

a transform block, formed by a multiplication unit and a Hadamard transform unit, which performs computations, based on a Hague algorithm, in a sequence of Hadamard transforms followed by multiplications in a two-dimensional discrete cosine transform (DCT) and performs computations in a sequence of multiplications followed by Hadamard transforms in an inverse two-dimensional discrete cosine transform (IDCT), said transform block has parallel 4-input/4-output transform units and includes a Hadamard transform unit formed from a plurality of multiplication units and a plurality of addition/subtraction units;

a memory block which temporarily stores input/output data of said transform block and which further reads out to said transform block data written into said memory block, said data being read out in a rearranged form;

an input/output processing block which is formed therein selectively by a pre-processing part and post-processing part receiving input/output data of said transform block, said input/output processing block being formed by a plurality of cumulative addition/subtraction units and a plurality of selector units which select and output data from each of said cumulative addition/subtraction units, in which only input data is applied to said pre-processing part as its input when the IDCT computing is to be achieved and only output data from said memory block is applied to the post-processing part as its input when the DCT computing is achieved; and a control block for controlling, when performing processing for either a two-dimensional discrete cosine transform or inverse two-dimensional discrete cosine transform, multiplications of coefficients in said transform block, a write address and read address of said memory block and said input/output processing block, and for causing repetitive computation processing of said two-dimensional discrete cosine transform or inverse two-dimensional discrete cosine transform.

2. A two-dimensional discrete cosine transform computing circuit according to claim 1, wherein each of said plurality of cumulative addition/subtraction units comprises:

a first selector which either selects input data or selects output data from another cumulative addition/subtraction unit;

an adder which has the output of said first selector as its first adding input;

an inverter;

a second selector which is connected to a second adding input of said adder, and which applies the previous output of said adder either directly or via said inverter to the second adding input of said adder;

a third selector which selects the output of said adder or, only at the start of computation, said input data; and a flip-flop connected between said second selector and said third selector.

3. A two-dimensional discrete cosine transform computing circuit according to claim 1, wherein said memory block includes a plurality of divided memory units, said memory units being operative to be written with parallel output data that is simultaneously distributed from said transform block and being operative to read out the parallel output data simultaneously to input said output data to said transform block.

* * * * *